(No Model.)
W. H. ASBURY.
ROOT CUTTER.
No. 399,816. Patented Mar. 19, 1889.
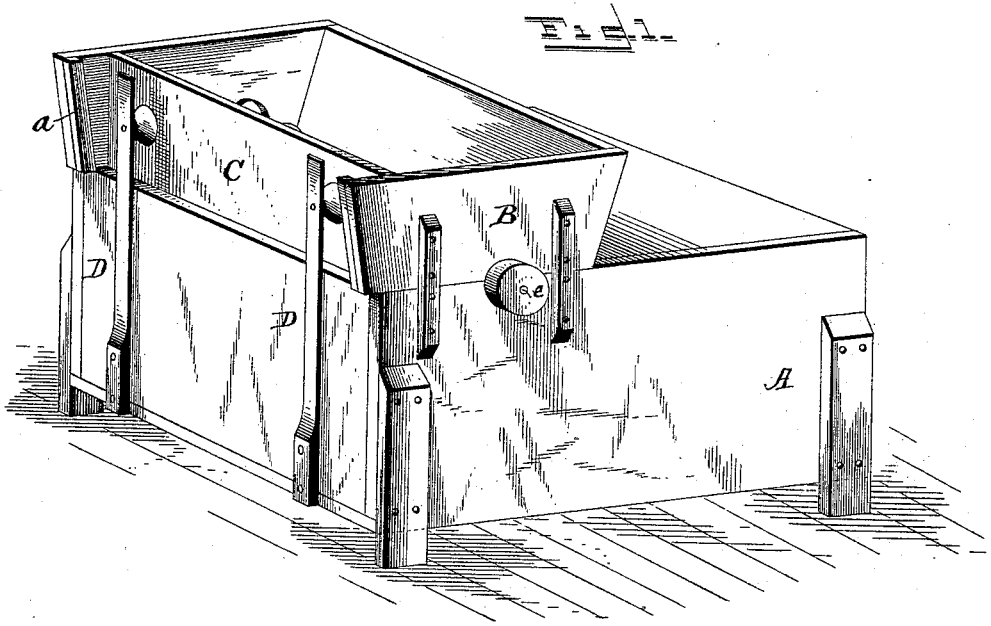
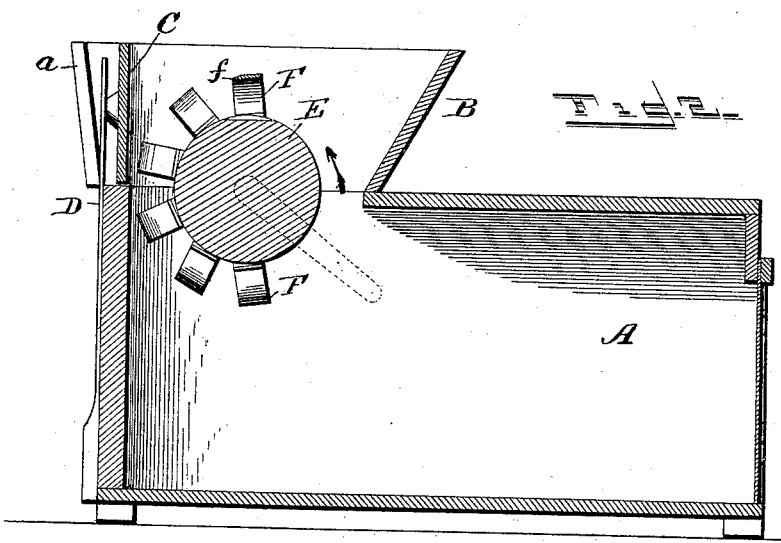
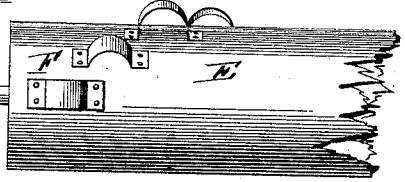
WITNESSES,
G. S. Elliott
E. W. Johnson
William H. Asbury.
INVENTOR,
By
his Attorney,

UNITED STATES PATENT OFFICE.

WILLIAM H. ASBURY, OF MARTINSBURG, NEBRASKA.

ROOT-CUTTER.

SPECIFICATION forming part of Letters Patent No. 399,816, dated March 19, 1889.

Application filed November 17, 1888. Serial No. 291,083. (No model.)

*To all whom it may concern:*

Be it known that I, WILLIAM H. ASBURY, a citizen of the United States of America, residing at Martinsburg, in the county of Dixon and State of Nebraska, have invented certain new and useful Improvements in Root-Cutters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in root-cutters, the object thereof being to provide a cutter adapted to cut vegetables in preparing food for livestock; and it consists in providing a cylinder with a series of spirally-arranged knives having convex cutting portions which will cut the vegetables into small particles, as will be hereinafter fully set forth, and specifically pointed out in the claim.

In the accompanying drawings, Figure 1 is a perspective view of a root-cutter constructed in accordance with my improvement. Fig. 2 is a sectional view. Fig. 3 is a detail view of a part of the cylinder.

A refers to the frame, which is made up of side, end, top, and bottom pieces, one end being provided with a vertical sliding door, through which the vegetables after being cut are removed. Above the frame or box is mounted a hopper, B, the side pieces of which extend over the lower frame, and are provided with inclined stops $a$ $a$, which limit the outward movement of the spring-board C, said spring-board being held in place by springs D D, the lower ends of which are attached to the end of the receptacle, while near their upper ends these springs are provided with blocks, through which securing means pass for connecting the boards C to the springs.

Between the upper edge of the box A and lower edge of the hopper B are provided bearings, in which the cylinder E is mounted, so as to rotate freely therein. This cylinder E is preferably turned from a piece of wood into which are secured shafts $e$, said shafts being provided at one end of the cylinder with a pulley and at the other end with a crank-handle, so that the cylinder can be rotated by hand, steam, or other power.

The cylinder E has attached thereto knives or cutters F, which are bent to form semicircular cutting-edges, the ends of said blades being bent and perforated to be readily attached to the surface of the cylinder by securing means. The knives or cutters F are arranged spirally around the cylinder, they being located so that the cutting-edges will be circumferentially on a line, and they are sharpened on their edges, as shown at $f$. A part of the cylinder immediately beneath the knives or cutters is removed to provide a rearwardly-inclined recess, which prevents the substance cut being jammed between the knife and cylinder.

The vegetables to be cut are placed in the hopper against the spring-board C, and as the cylinder is rotated in the direction of the arrow shown in Fig. 2 the cutters will remove therefrom semicircular pieces, which will be deposited in the box A.

The device hereinbefore described is simple, and there are no parts to get out of order, and it is easily operated, as comparatively few knives are in contact with the vegetables at the same time.

I claim—

The combination, in a vegetable or root cutter, with a receptacle, A, having a hopper, B, and spring-board C, of a cylinder mounted between the hopper and receptacle, said cylinder being provided with semicircular cutters arranged spirally upon the cylinder, substantially as shown, and for the purpose set forth.

In testimony whereof I affix my signature in presence of two witnesses.

WILLIAM H. $\overset{\text{his}}{\times}$ ASBURY.
mark

Witnesses:
 JAMES E. MOORE,
 J. W. RADFORD.